United States Patent
Zhao et al.

(10) Patent No.: US 11,010,619 B2
(45) Date of Patent: May 18, 2021

(54) DEVICE AND A METHOD FOR SEARCHING FOR A LANE ON WHICH A VEHICLE CAN DRIVE

(71) Applicant: Aptiv Technologies Limited, St. Michael (BB)

(72) Inventors: Kun Zhao, Duisburg (DE); Yu Su, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 150 days.

(21) Appl. No.: 16/383,858

(22) Filed: Apr. 15, 2019

(65) Prior Publication Data

US 2019/0354779 A1 Nov. 21, 2019

(30) Foreign Application Priority Data

May 15, 2018 (EP) .................................. 18172365

(51) Int. Cl.
*G06K 9/00* (2006.01)
*G06T 7/70* (2017.01)

(52) U.S. Cl.
CPC ............ *G06K 9/00798* (2013.01); *G06T 7/70* (2017.01); *G06T 2207/30256* (2013.01)

(58) Field of Classification Search
None
See application file for complete search history.

(56) References Cited

U.S. PATENT DOCUMENTS

| | | | |
|---|---|---|---|
| 2004/0016870 A1* | 1/2004 | Pawlicki ............ | G06K 9/00805 250/208.1 |
| 2016/0176341 A1* | 6/2016 | Raghu ............. | B60W 30/18154 348/148 |
| 2017/0039436 A1* | 2/2017 | Chen ..................... | G06K 9/4628 |
| 2019/0035110 A1* | 1/2019 | Shikimachi ........ | G01C 21/3626 |
| 2019/0163990 A1* | 5/2019 | Mei ........................ | G01C 21/32 |
| 2020/0042807 A1* | 2/2020 | Schutzmeier ........ | G08G 1/0141 |

OTHER PUBLICATIONS

Regine Graf et al: "Probabilistic estimation of temporary lanes at road work zones", Sep. 16, 2012, pp. 716-721.
Gumpp T et al: "Recognition and tracking of temporary lanes in motorway construction sites", Jun. 3, 2009, pp. 305-310.
Zhao Kun et al: "A novel multi-hypothesis tracking framework for lane recognition", Jul. 7, 2014, pp. 1-8.

* cited by examiner

*Primary Examiner* — Fayyaz Alam
(74) *Attorney, Agent, or Firm* — Colby Nipper PLLC

(57) ABSTRACT

A device for searching for a lane on which a vehicle can drive, wherein the device is configured to receive an image captured by a camera, the image showing an area in front of the vehicle, detect lane markings in the image, determine for each of the lane markings if the respective lane marking is of a first type indicating a road condition of a first type or a second type indicating a road condition of a second type, create lane candidates from the lane markings, divide the lane candidates into classes of lane candidates depending on the type of the lane markings of the lane candidates, and search the classes of lane candidates for a lane on which the vehicle can drive.

20 Claims, 4 Drawing Sheets

DEVICE AND A METHOD FOR SEARCHING FOR A LANE ON WHICH A VEHICLE CAN DRIVE

TECHNICAL FIELD OF INVENTION

This disclosure generally relates to searching for a lane on which a vehicle can drive.

BACKGROUND OF INVENTION

Lane detection (LD) systems provide sensing functions for lane departure warning (LDW) systems, lane keeping assistant (LKA) systems, or autonomous driving. With modern lane detection systems capable of detecting multiple lane markings, certain scenarios become challenging, for examples, construction sites where multiple lane markings are painted on the road, for example, in white and yellow colors. For a successful lane detection in the area of a construction site the lane detection system needs to correctly estimate all markings with their colors and estimate the correct ego lane for the application on which the vehicle shall drive.

Even when multiple lane markings with the same color are applied, the correct selection of the ego and adjacent markings is not always simple. Further, there are scenarios where lane markings are missing or lane markings are detected incorrectly. In this case, it is challenging to choose the correct and, in confusing situations, the most reasonable lane markings.

Conventional single-lane detection systems do not offer solutions for these challenging scenarios. For example, when the vehicle passes a construction site, a common solution in a conventional lane detection system is to shut down the system during the construction site when yellow lane markings are detected. This avoids false detections, but of course it also restricts the system availability.

SUMMARY OF THE INVENTION

Described herein is a device for searching for a lane on which a vehicle can drive even in scenarios with road conditions different from normal road conditions, for example, in the area of construction sites. It is further an object of the invention to provide a system that comprises the device and a method for searching for a lane on which a vehicle can drive.

In a first aspect of the instant application a device for searching for a lane on which a vehicle can or shall drive, i.e., the ego lane, is provided.

The device is configured to receive an image captured by a camera. The camera may be mounted on the vehicle and is configured to capture an image of the area in front of vehicle. If the vehicle drives on a road, the image captured by the camera shows the road scenario in front of the vehicle.

The device is configured to detect lane markings in the image captured by the camera. For each of the detected lane markings the device determines whether the respective lane marking is of a first type or a second type. The lane markings of the first type indicate a road condition of a first type, for example, a normal road condition. The lane markings of the second type indicate a road condition of a second type, for example, a construction site.

The device is configured to create lane candidates from the lane markings. A lane candidate is a lane on which the vehicle can possibly drive. A lane candidate can be a lane between two of the detected lane markings. It is, however, also possible that a lane candidate has only a lane marking on one side of the lane.

The device is configured to divide the lane candidates into classes of lane candidates. The classes of lane candidates may be predetermined classes and the lane candidates of each class may have specific features. In other words, each of the classes comprises lane candidates with predetermined features. One of these features is the type of the lane markings. Thus, the lane candidates are sorted into the classes depending on the type of the lane markings of the lane candidates. Each class may be associated with a corresponding list in which the lane candidates of the respective class are sorted or written.

The device is further configured to search the classes of lane candidates for a lane on which the vehicle can or shall drive, i.e., the ego lane. It is possible that the ego lane can be found within one of the classes. It is also possible that no ego lane can be found within the classes.

The device allows to drive the vehicle in scenarios with different road conditions having different lane markings, for example, when the vehicle passes a construction site.

In one embodiment, the device is further configured to determine for each of the lane markings if the respective lane marking is a left lane marking or a right lane marking. A left lane marking is arranged on the left hand side of the lane or the vehicle and a right lane marking is arranged on the right hand side of the lane or the vehicle. Further, the device may use the orientation of the lane markings, i.e., the information whether a respective lane marking is a left lane marking or a right lane marking, for classifying the lane candidates. Thus, the division of the lane candidates into classes of lane candidates may not only depend on the type of the lane markings of the lane candidates, but also on the orientation of the lane markings.

In a further embodiment, the classes of lane candidates comprise at least classes a) to e). For each of the classes a) to e) a corresponding list may be provided in which the lane candidates of the respective class can be sorted or written.

Class a) is for lane candidates that have a left lane marking of the second type and a right lane marking of the second type.

Class b) is for lane candidates that have a left lane marking and a right lane marking, wherein one of the two lane markings is of the first type and the other one of the two lane markings is of the second type.

Class c) is for lane candidates that have a lane marking on only one side and this lane marking is of the second type. On the other side of the lane there is no lane marking.

Class d) is for lane candidates that have a left lane marking of the first type and a right lane marking of the first type.

Class e) is for lane candidates that have a lane marking on only one side and this lane marking is of the first type. On the other side of the lane there is no lane marking.

The device may be further configured to search the classes of lane candidates sequentially for a lane on which the vehicle can drive. In particular, the classes are searched in a given order meaning that there is a predetermined hierarchy among the classes. For example, the device first searches the class a) whether this class contains a lane candidate which can be used as the ego lane for driving the vehicle. Then, the device searches the classes b), c), d), and e) in this order to check whether at least one of these classes contains an ego lane.

The device may be further configured to terminate searching the classes of lane candidates as soon as a lane on which the vehicle can drive has been selected. For example, if an ego lane has been found in class a), the device terminates the search and does not search classes b), c), d) and e) for the ego lane.

The device may be further configured to assign a lane candidate to one of the classes at the time when the lane candidates are divided into the classes of lane candidates only if the lane candidate fulfills one or more criteria. The criteria may be selected among the following three criteria, wherein any combination of criteria is possible and further or alternative criteria may be added.
1. A lane candidate is assigned to one of the classes if the width of the lane candidate is equal to or greater than a predetermined width.
2. A lane candidate is assigned to one of the classes if the lane marking of the lane candidate is within a predetermined first distance from the vehicle in case the lane candidate has a lane marking on only one side and there is no lane marking on the other side.
3. A lane candidate is assigned to one of the classes if the lane candidate is within a predetermined second distance from a lane that has been selected for driving the vehicle previously.

Further, the device may be configured to select a lane candidate from one of the classes as the lane on which the vehicle can drive. For this decision, one or more of the three aforementioned criteria can be used. Further, the whole geometry information of a lane candidate, e.g., offset, slope, curvature, curvature change rate etc., can be considered when selecting one of the lane candidates as the lane on which the vehicle can drive. For example, a lane candidate with two lane markings that have a good width in front of the vehicle but then intersect may not be a good candidate if other candidates are available. Further, each lane marking has its appearance information, e.g., extracted features from the image and its classified type, for example, a solid or dashed lane marking etc. In addition, each lane marking has its meta data, for example, how confident the classifier is about the type of the lane marking (solid, dashed etc.) and how confident the tracker is about the geometry of the lane candidate. In addition, not only the image of the current frame, but also images of previous frames can be considered. For selecting a lane candidate from one of the classes as the lane on which the vehicle can drive, the device may use one or more of the criteria described herein. Alternative or additional criteria for selecting a lane candidate as the lane on which the vehicle can drive are that the lane candidate is stable and/or the lane candidate has no abrupt jump and/or the lane candidate has no abrupt width change.

In a further embodiment, the road condition of the first type is a normal road condition, i.e., not a constructing site, and the road condition of the second type is a construction site.

In yet a further embodiment, a lane marking of the first type has a predetermined first color, in particular white or non-yellow, and a lane marking of the second type has a predetermined second color, in particular yellow.

According to a second aspect of the instant application, a system for searching for a lane on which a vehicle can drive comprises a camera for capturing an image and a device as described above.

According to a third aspect of the instant application, a method for searching for a lane on which a vehicle can drive comprises the following steps: receiving an image captured by a camera, the image showing an area in front of the vehicle, detecting lane markings in the image, determining for each of the lane markings if the respective lane marking is of a first type indicating a road condition of a first type or a second type indicating a road condition of a second type, creating lane candidates from the lane markings, dividing the lane candidates into classes of lane candidates depending on the type of the lane markings of the lane candidates, and searching the classes of lane candidates for a lane on which the vehicle can drive.

The method according to the third aspect of the application may comprise the embodiments disclosed above in connection with the device according to the first aspect of the application.

Further features and advantages will appear more clearly on a reading of the following detailed description of the preferred embodiment, which is given by way of non-limiting example only and with reference to the accompanying drawings.

BRIEF DESCRIPTION OF DRAWINGS

Further details will be described in the following in an exemplary manner with reference to an embodiment and to the drawings. There are shown in these.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
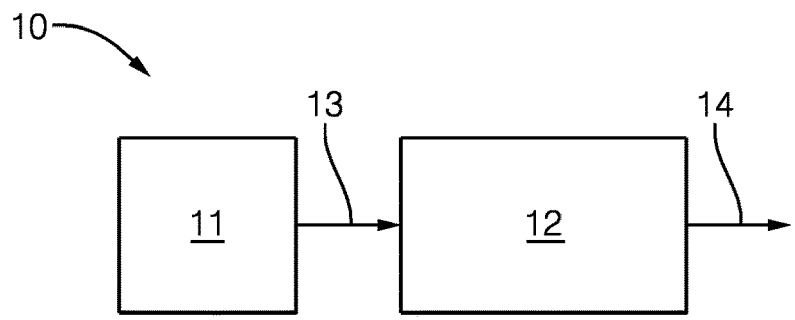
FIG. 1 is a schematic representation of an exemplary embodiment of a system for searching for a lane on which a vehicle can drive.

FIG. 1 schematically illustrates a system 10 for searching for a lane on which a vehicle can drive. The system 10 includes a camera 11 and a device 12. The system 10 is installed in the vehicle, which is the ego vehicle.

The camera 11 is mounted on the vehicle and captures images 13 of the area in front of the vehicle.

The images 13 captured by the camera 11 are fed to the device 12. The device 12 performs a method 20 for searching for a lane on which the vehicle can drive and generates an output signal 14 which contains information on the lane on which the vehicle can drive. The method 20 is schematically illustrated in FIG. 2.

The device 12, the system 10 and the method 20 are exemplary embodiments according to the first, second and third aspect of the application, respectively.

Figure 2:
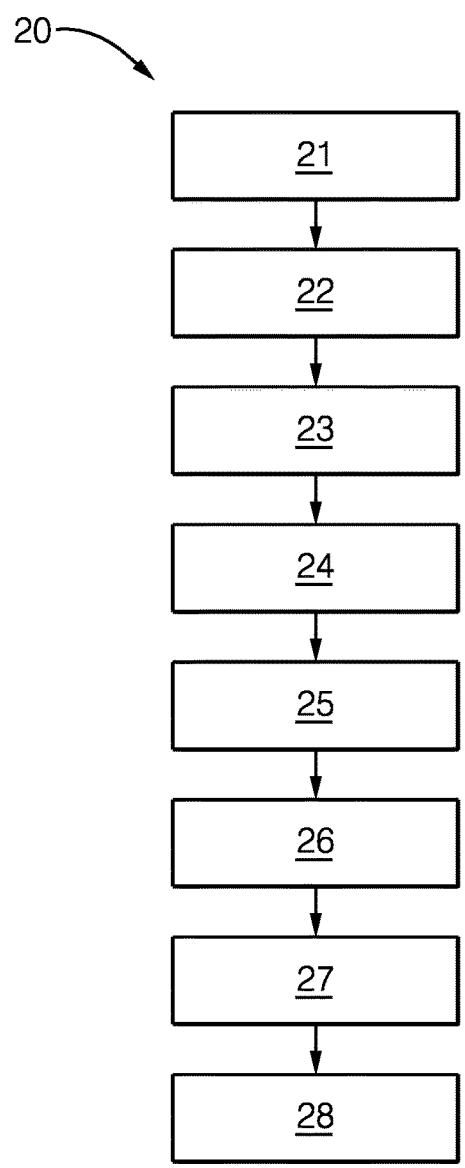
FIG. 2 is a schematic representation of an exemplary embodiment of a method for searching for a lane on which a vehicle can drive.

In step 21 of the method 20 illustrated in FIG. 2, the camera 11 captures an image 13 of the scene in front of the vehicle. If the vehicle drives on a road, the image 13 shows the road. The camera 11 captures images 13 in consecutive frames. For example, a single image 13 is captured in each frame.

In step 22, the device 12 receives the image 13 captured by the camera 11 in step 21.

In step 23, the device 12 searches for lane markings in the image 13. If the image 13 shows lane markings, the device 12 detects these lane markings. The device 12 can detect n individual and independent lane markings. n can be 0, can be greater than 0 and can also be greater than 4.

In step 24, the device 12 determines for each of the lane markings if the respective lane marking is a left lane marking, which is on the left hand side of the vehicle, or the respective lane marking is a right lane marking, which is on the right hand side of the vehicle. In other words, the detected lane markings are separated into left and right sets, according to their lateral offset relative to the vehicle.

A task of the device 12 is to correctly select the lane markings, which represent the ego lane, i.e., the lane on which the vehicle can/shall drive, and also fulfill the traffic rules. Selecting the correct ego lane is especially challenging during a construction site, i.e., when the vehicle passes a construction site on the road.

Lane markings at a construction site have specific features, in particular, the color of the lane markings at a construction site is different from the color of the lane markings at non-construction sites. In many countries, the lane markings at a construction site are yellow, while the lane markings at non-construction sites are non-yellow, in particular white.

The rules during the construction site are that, when the yellow lane markings exist, they overwrite the existing white lane markings. But depending on the each individual construction site and the road work there, not all the necessary lane markings are repainted with yellow, but often the existing white lane markings are also used together with the yellow lane markings. Or the yellow lane markings are painted over the existing white lane markings.

A correct ego lane can consist of an ego left lane marking and an ego right lane marking, each of them can be yellow or white. It can also be the case that the ego lane has a lane marking only on one side of the lane, either yellow or white. Of course, there is also the case where there is no ego lane marking at all.

In step 25 of the method 20, the device 12 determines for each of the lane markings detected in step 23 if the respective lane marking is of a first type indicating a road condition of a first type or a second type indicating a road condition of a second type. In the instant embodiment the road condition of the first type is a non-constructing site and the road condition of the second type is a construction site. Further, in the instant embodiment, a lane marking of the first type is white and a lane marking of the second type is yellow.

In step 26, the device 12 creates lane candidates from the lane markings. A lane candidate can have lane markings on both sides of the lane or a lane marking only on one side of the lane. It is obvious that if a lane consists of two lane markings, these markings have to be one at the left side, and one at the right side of the vehicle. It is maybe less obvious that, in the real world, one lane marking could be missing and a single lane marking could also represent the ego lane.

There are several classes of lane candidates, in particular classes a) to e). FIGS. 3A to 3E show examples of lane candidates of classes a) to e), respectively. FIGS. 3A to 3E are schematic representations of images 13 captured by the camera 11. The images 13 of FIGS. 3A to 3E show a road 40, a portion 41 of the vehicle, left lane markings 42 being on the left hand side of the vehicle and right hand lane markings 43 being on the right hand side of the vehicle. White lane markings are not hatched and yellow lane markings are hatched in FIGS. 3A to 3E.

Figure 3A:
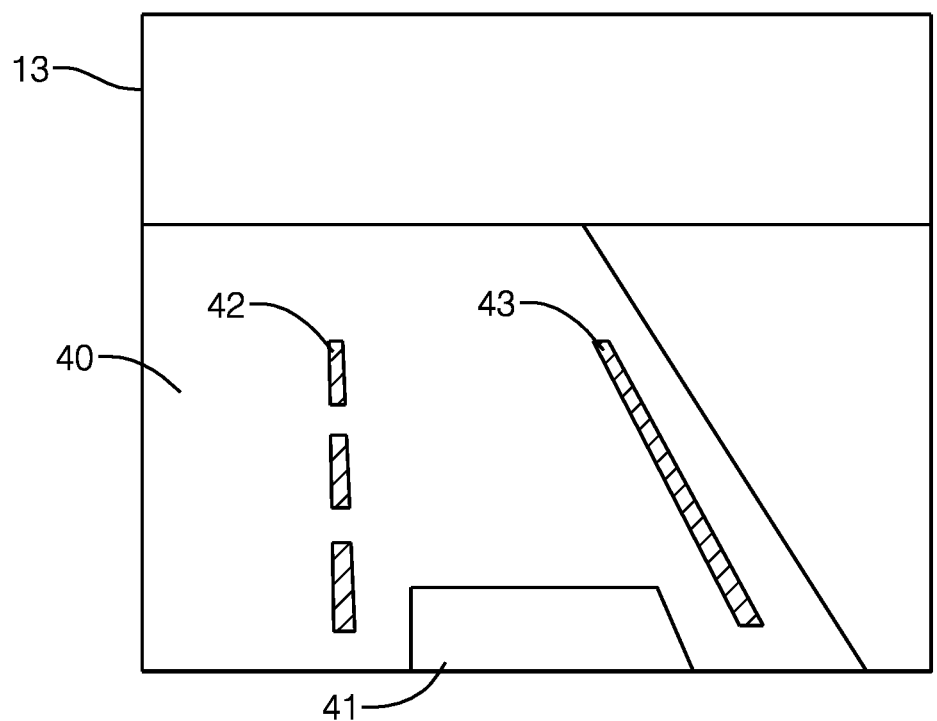
FIGS. 3A to 3E are schematic representations of images captured by a camera mounted on the vehicle.
Figure 3B:
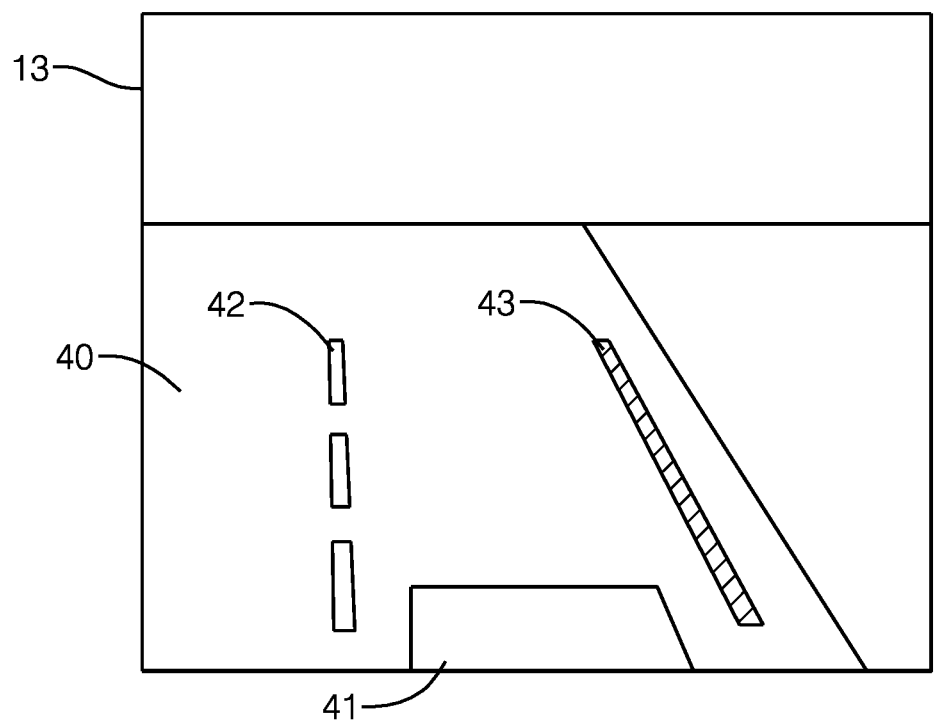
Figure 3C:
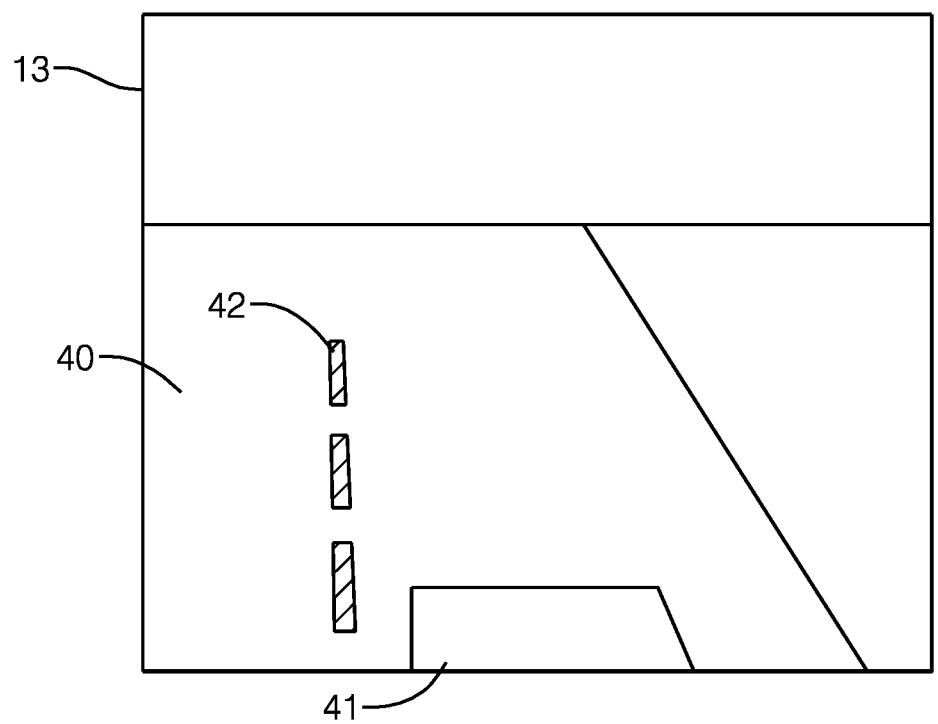

Lanes or lane candidates of class a) have a yellow left lane marking 42 and a yellow right lane marking 43 as shown in FIG. 3A.

Lanes or lane candidates of class b) have a left lane marking 42 and a right lane marking 43, wherein one of the lane markings 42, 43 is yellow and the other one of the lane markings 42, 43 is white. In the example of the FIG. 3B, the left lane marking 42 is white and the right lane marking 43 is yellow.

Lanes or lane candidates of class c) have a lane marking on only one side of the lane, wherein this lane marking is yellow. In the example of the FIG. 3C, there is only a yellow left lane marking 42 and no right lane marking 43.

Figure 3D:
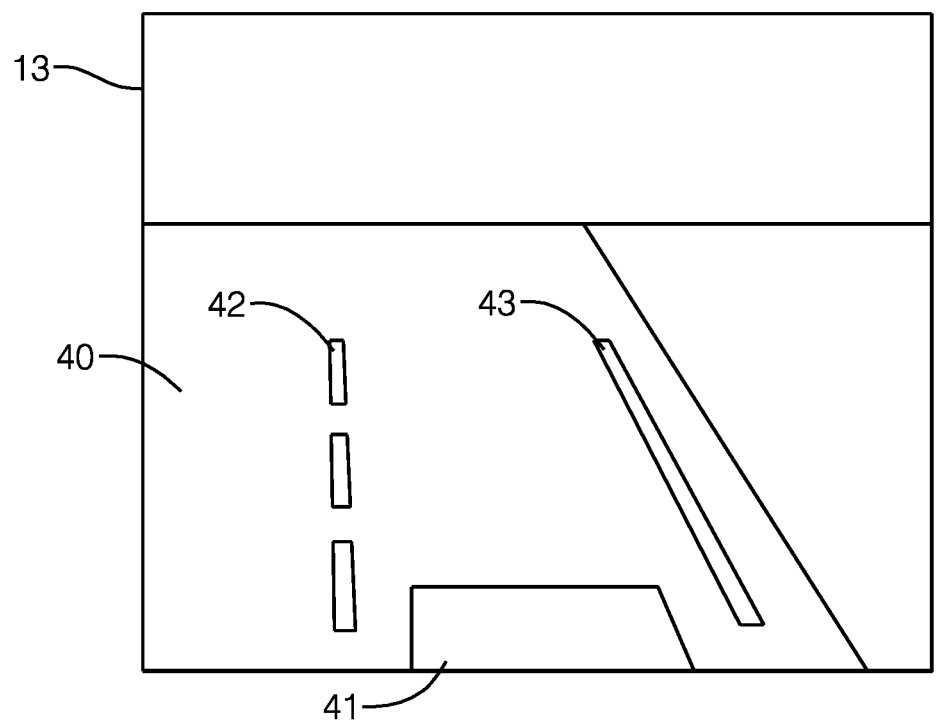
Figure 3E:
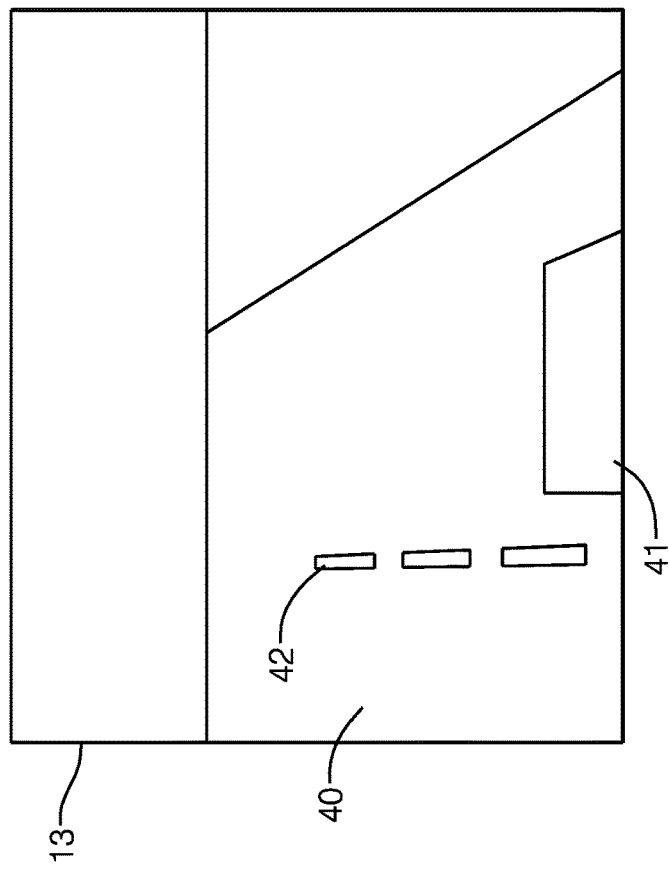

Lanes or lane candidates of class d) have a white left lane marking 42 and a white right lane marking 43 as shown in FIG. 3D.

Lanes or lane candidates of class e) have a lane marking on only one side of the lane, wherein this lane marking is white. In the example of the FIG. 3E, there is only a white left lane marking 42 and no right lane marking 43.

In step 27 of the method 20, the device 12 divides the lane candidates created in step 26 into the classes a) to e) of lane candidates depending on the type of the lane markings of the lane candidates. Thus, each of the lane candidates is classified as a lane of one of the classes a) to e). Further, there is a respective list for each of the classes a) to e), in which the lane candidates identified in step 27 can be written.

To be a feasible candidate in step 27, a lane candidate has to fulfill certain predetermined criteria, i.e., lane candidates that do not fulfill the predetermined criteria are not assigned to one of the classes a) to e) in step 27. In the following, examples of these criteria are given, however there can be further or alternative criteria as well:

a) The width of a lane candidate, which has both left and right lane markings, has to fall in a reasonable interval. For example, a minimum width of 2.1 meters may be applied during the construction site. Or a width of 6 meters may be applied during a highway entrance ramp. Thus, a lane candidate can be assigned to one of the classes a) to e) if the width of the lane candidate is equal to or greater than a predetermined width.

b) The lane marking offset of a lane candidate, which only has a lane marking on one side, has to be close enough to the vehicle. Thus, a lane candidate can be assigned to one of the classes a) to e) if the lane marking of the lane candidate is within a predetermined first distance from the vehicle in case the lane candidate has a lane marking on only one side.

c) A feasible lane candidate has to be close to the ego lane selected in last image frame. Thus, a lane candidate can be assigned to one of the classes a) to e) if the lane candidate is within a predetermined second distance from a lane that has been selected for driving the vehicle previously.

In step 28, the device 12 searches the classes a) to e) of lane candidates and, in particular, the lists associated with the classes a) to e) for a lane on which the vehicle can drive, i.e., the ego lane.

The device 12 searches the classes a) to e) of lane candidates sequentially for the ego lane in a given order, i.e., according to their priority. The device 12 starts with class a) and continues then with class b), c) and d) until class e) has been reached. If the list of one of the classes includes more than one lane candidate, the device 12 can select the most suitable lane candidate from the list of this class as the ego lane. For this decision, for example, geometry information of the lane candidates from the current frame and previous frames and/or meta data and/or other criteria can be used.

Figure 4:
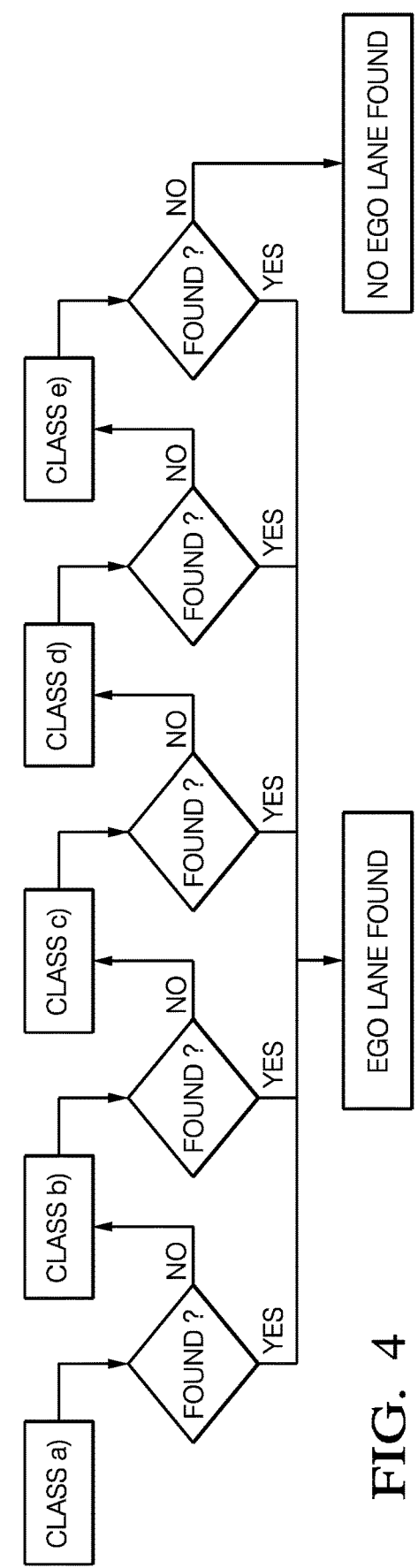
FIG. 4 is a schematic representation of a search for an ego lane.

The device 12 terminates searching the classes of lane candidates as soon as the ego lane has been found in the list of one of the classes. The lists of the remaining classes are then skipped. This procedure is schematically illustrated in FIG. 4.

For example, if the left and right lane markings during a construction site are both painted using yellow, then one possible lane candidate will be found in the list of class a). The lists of classes b) to e) can then be skipped.

If during the construction site, a lane marking on only one side of the lane is painted using yellow, and on the other side of the lane there is still the existing white lane marking, then the list of class a) should be empty, but the list of class b) should contain the correct ego lane as a lane candidate.

One could also see that during the normal road driving, where there is no yellow lane marking, the lists of classes a), b) and c) should be empty. But only the lists of classes d) and e) contain lane candidates. The method 20 thus always tries to find a feasible pair of ego lane markings for the ego lane.

The selected ego lane is output by the device 12 as the output signal 14 for further processing, for example, for directing the vehicle to the selected ego lane.

The examples of FIGS. 3A to 3E show only one lane for simplicity reasons. Of course, the device 12 can also select the correct ego lane for multiple lanes. Further, lane markings of different colors can overlap each other and the device 12 is still able to select the ego lane correctly.

While this invention has been described in terms of the preferred embodiments thereof, it is not intended to be so limited, but rather only to the extent set forth in the claims that follow.

We claim:

1. A device for searching for a lane on which a vehicle can drive, wherein the device is configured to:
   receive an image captured by a camera, the image showing an area in front of the vehicle;
   detect lane markings in the image;
   determine for each of the lane markings if the respective lane marking is a left lane marking or a right lane marking;
   determine for each of the lane markings if the respective lane marking is of a first type indicating a road condition of a first type or a second type indicating a road condition of a second type;
   create lane candidates from the lane markings;
   divide the lane candidates into classes of lane candidates depending on the type of the lane markings of the lane candidates, wherein the classes of lane candidates comprise one or more classes comprising lane candidates having a lane marking on only one side of the lane; and
   search the classes of lane candidates for a lane on which the vehicle can drive.

2. The device as claimed in claim 1, wherein the classes of lane candidates comprise classes a) to e), wherein:
   class a) comprises lane candidates having a left lane marking of the second type and a right lane marking of the second type;
   class b) comprises lane candidates having a left lane marking and a right lane marking with one of the lane markings being of the first type and the other one being of the second type;
   class c) comprises lane candidates having a lane marking on only one side, the lane marking being of the second type;
   class d) comprises lane candidates having a left lane marking of the first type and a right lane marking of the first type; and
   class e) comprises lane candidates having a lane marking on only one side, the lane marking being of the first type.

3. The device as claimed in claim 1, wherein the device is further configured to search the classes of lane candidates sequentially for a lane on which the vehicle can drive.

4. The device as claimed in claim 1, wherein the device is further configured to terminate searching the classes of lane candidates when a lane on which the vehicle can drive has been selected.

5. The device as claimed in claim 1, wherein the device is further configured to assign a lane candidate to one of the classes only if the lane candidate fulfils one or more criteria.

6. The device as claimed in claim 5, wherein one of the criteria is that a width of the lane candidate is equal to or greater than a predetermined width.

7. The device as claimed in claim 5, wherein one of the criteria is that the lane marking of the lane candidate is within a predetermined first distance from the vehicle in case the lane candidate has a lane marking on only one side.

8. The device as claimed in claim 5, wherein one of the criteria is that the lane candidate is within a predetermined second distance from a lane that has been selected for driving the vehicle previously.

9. The device as claimed in claim 1, wherein the road condition of the first type is a non-construction site and the road condition of the second type is a construction site.

10. The device as claimed in claim 1, wherein a lane marking of the first type is non-yellow, and a lane marking of the second type is yellow.

11. A system comprising:
a camera configured to capture an image; and
a device for searching for a lane on which a vehicle can drive, wherein the device is configured to:
receive an image captured by the camera, the image showing an area in front of the vehicle;
detect lane markings in the image;
determine for each of the lane markings if the respective lane marking is a left lane marking or a right lane marking;
determine for each of the lane markings if the respective lane marking is of a first type indicating a road condition of a first type or a second type indicating a road condition of a second type;
create lane candidates from the lane markings;
divide the lane candidates into classes of lane candidates depending on the type of the lane markings of the lane candidates, wherein the classes of lane candidates comprise one or more classes comprising lane candidates having a lane marking on only one side of the lane; and
search the classes of lane candidates for a lane on which the vehicle can drive.

12. A method for searching for a lane on which a vehicle can drive, the method comprising:
receiving an image captured by a camera, the image showing an area in front of the vehicle;
detecting lane markings in the image;
determining for each of the lane markings if the respective lane marking is a left lane marking or a right lane marking;
determining for each of the lane markings if the respective lane marking is of a first type indicating a road condition of a first type or a second type indicating a road condition of a second type;
creating lane candidates from the lane markings;
dividing the lane candidates into classes of lane candidates depending on the type of the lane markings of the lane candidates, wherein the classes of lane candidates comprise one or more classes comprising lane candidates having a lane marking on only one side of the lane; and
searching the classes of lane candidates for a lane on which the vehicle can drive.

13. The method as claimed in claim 12, wherein the classes of lane candidates comprise classes a) to e), wherein:
class a) comprises lane candidates having a left lane marking of the second type and a right lane marking of the second type;
class b) comprises lane candidates having a left lane marking and a right lane marking with one of the lane markings being of the first type and the other one being of the second type;
class c) comprises lane candidates having a lane marking on only one side, the lane marking being of the second type;
class d) comprises lane candidates having a left lane marking of the first type and a right lane marking of the first type; and
class e) comprises lane candidates having a lane marking on only one side, the lane marking being of the first type.

14. The method as claimed in claim 12, including searching the classes of lane candidates sequentially for a lane on which the vehicle can drive.

15. The method as claimed in claim 12, including terminating searching the classes of lane candidates when a lane on which the vehicle can drive has been selected.

16. The method as claimed in claim 12, including assigning a lane candidate to one of the classes only if the lane candidate fulfils one or more criteria.

17. The method as claimed in claim 16, wherein one of the criteria is that a width of the lane candidate is equal to or greater than a predetermined width.

18. The method as claimed in claim 16, wherein one of the criteria is that the lane marking of the lane candidate is within a predetermined first distance from the vehicle in case the lane candidate has a lane marking on only one side.

19. The method as claimed in claim 16, wherein one of the criteria is that the lane candidate is within a predetermined second distance from a lane that has been selected for driving the vehicle previously.

20. The method as claimed in claim 12, wherein the road condition of the first type is a non-construction site and the road condition of the second type is a construction site.

* * * * *